Patented Dec. 1, 1953

2,661,337

UNITED STATES PATENT OFFICE 2,661,337

CATION EXCHANGE MATERIAL HAVING HIGH MECHANICAL STRENGTH

Morris L. Nielsen, Dayton, Ohio, assignor to Monsanto Chemical Company, St. Louis, Mo., a corporation of Delaware No Drawing. Application August 28, 1950, Serial No. 181,915

4 Claims. (Cl. 252—313)

The present invention is concerned with cellulosic-nitrogen- and phosphorus-containing materials which have the property of exchanging cations in aqueous solutions.

It is an object of the invention to provide a material adaptable to the process of softening of water. It is a further object of the invention to provide a material derived from cellulose which enables undesirable cations to be removed from a liquid by ion exchange. It is also an object of the invention to provide a material having high strength both in the wet and dry states.

Cation exchange systems in the past have utilized various mineral-derived materials, or else some synthetic, organic chemical compositions for the purpose of removing calcium and magnesium ions from aqueous solutions by substituting sodium or other ions therefor. Such ion exchange systems are useful, for example, in reducing the hardness of water and preventing the deposition of scale.

Experiments have also been made to react the cellulose of cotton with various chemicals to provide cation exchange materials, but it has been a disadvantage of such products that the strength of said materials is very low so that they could not readily be employed in commercial devices intended for water softening or other base exchange operations. Since it is necessary to operate with as little pressure drop as possible, it has been difficult to apply the prior art materials as filter type elements because of their low strength.

It has now been discovered that the product of the reaction of cellulose with a particular preformed nitrogen-phosphorus-containing composition may be employed for the removal or exchange of ions in aqueous solutions. These reaction products have been found to possess high strength so that structures suitable for ion exchange purposes may be made from such material.

The phosphorus-nitrogen-modified cellulose which is employed in the present process is obtained by the reaction of cellulose with the water-soluble phosphorus- and nitrogen-containing product described in copending application Serial No. 169,513, filed June 21, 1950. The copending application is assigned to the same assignee as is the present case.

According to the copending application, referred to above, the phosphorus- and nitrogen-containing products utilized in the present invention are produced by first reacting together phosphorus oxychloride and ammonia, preferably in an inert solvent. The product produced by this reaction is then heated to a temperature of at least 110° C., but not above 150° C. The above reaction also yields by-product ammonium chloride corresponding in amount to the chlorine present in the phosphorus oxychloride. For the present purpose the ammonium chloride may be largely removed. This is done by the extraction of the heat-treated phosphorus oxychloride-ammonia reaction product by means of solvents. In general, the extraction is best carried out employing liquid anhydrous ammonia as the extracting solvent which dissolves the ammonium chloride, leaving the ammonia-insoluble phosphorus-nitrogen compound as a white, non-hygroscopic solid.

In carrying out the process of the invention to produce the present products, the preparation may suitably commence with the solution of phosphorus oxychloride in a solvent. The phosphorus oxychloride so dissolved is then reacted with ammonia in gaseous or liquid form with suitable agitation. The temperature should be maintained below 100° C. during the addition of the ammonia. However, after the addition of at least the stoichiometric proportion of ammonia (5 moles per mole of $POCl_3$) the temperature is raised and the product heated to at least 110° C., but not above 150° C. It has been found that the temperature control within the above limits is essential to prevent the formation of a water-insoluble product on the one hand, and on the other hand to alter the intermediate product so that the subsequent separation and purification steps can be carried out successfully. The reaction of phosphorus oxychloride with ammonia, followed by heating the reaction product to at least 110° C., but not above 150° C., yields the desired composition in a form insoluble in liquid anhydrous ammonia. Ammonium chloride is formed as a by-product by reaction of ammonia with the chlorine present in the phosphorus oxychloride. As a result of the conditions under which the present product is prepared, it has been found to be possible to form the nitrogen-phosphorus product so that it possesses solubility characteristics enabling the subsequent separation of the product from the ammonium chloride to be carried out by differential solubility methods. At the same time the desired product is obtained in a form which is highly reactive with cellulose.

Phosphorus oxychloride to the amount of 90 pounds is dissolved in 90 gallons of hexane contained in an autoclave. The solution is heated to approximately 55° C. while stirring, and gaseous anhydrous ammonia is added thereto. Although an exothermic reaction takes place, the reaction may be carried out at about 75° C. by cooling the vessel. Ammonia to the extent of 50 pounds (5 moles per mole of phosphorus oxychloride) is added to the autoclave over a two hour period. An excess of ammonia may be used. After the addition of this amount of ammonia, the autoclave is sealed and then heated to about 130° C. for approximately 1½ hours. After the completion of the heating period, the reaction mixture is cooled to below 40° C. and then transferred to a second vessel containing a filter element and provided with external heating means. By applying heat to the autoclave contents the hexane present is distilled off, condensed and recovered. The remaining solids which consists of a mixture of the nitrogen- and phosphorus-containing product with ammonium chloride are then extracted under pressure with anhydrous ammonia at about room temperature. A total of about 20 pounds of ammonia per pound of final product is employed, although it is also possible to carry out an extraction with 10 pounds of ammonia per pound of product. The slurry of product in anhydrous liquid ammonia was filtered by means of a filtering device contained within the autoclave. In this manner, substantially all of the ammonium chloride is leached from the residual solids. After the last extraction the residual ammonia adhering to the product is removed by evaporation induced by the application of heat to the product. The yield of the nitrogen-phosphorus product obtained is approximately 85% of the theoretical. The product contains 33.8% nitrogen, 35.1% phosphorus, N/P ratio=2.14.

The nitrogen-phosphorus product so produced has, when dissolved in aqueous solutions, a pH within the range of from 7.0 to 8.5, a molecular weight of from 180 to 300, a preferred range being from 200 to 250, and has a nitrogen to phosphorus atomic ratio of from 2.1 to 2.3. The nitrogen to phosphorus ratio and the pH depend somewhat upon the temperature employed in the heating step. The so-formed nitrogen-phosphorus product is soluble not only in water but also in glycerine, ethylene glycol and formamide.

The so-formed nitrogen-phosphorus product may be applied to cellulose in any form. It may be in the form of wood, rayon, paper, loose cotton flock, or threads, or a cotton fabric preferably of a loose weave may be used. Since the nitrogen-phosphorus product is water-soluble the application to cellulose and reaction therewith may readily be carried out in aqueous solutions. After application of the solution, the base material is heated to a temperature of 100° C. to 200° C. to insolubilize the nitrogen-phosphorus composition to the cellulose.

The treated cellulosic material may have from 5% to 20% of the said nitrogen-phosphorus product deposited upon the material and in chemical combination with cellulose. The evidence for chemical combination with cellulose is found in the stability of the product in the presence of water. The proportion of the nitrogen-phosphorus composition combined with the cellulose of the cloth is not critical and higher add-ons than 5% to 20% of the cellulose may be employed based upon the weight of the cellulosic base material.

The cellulose treated with the nitrogen-phosphorus composition should then be treated with an acid before use as a cation exchanger, thereby providing available acid groups for use in the cation exchange process. The particular acid used is not critical, so that any strong acid, such as hydrochloric or sulfuric acid, may be employed.

The phosphorus-nitrogen-cellulose combination may be employed as a filter medium through which aqueous solutions may be passed in order to carry out the cation exchange operation. However, the material may also be provided in the form of a cotton fabric either woven or merely formed into blocks or sheets from the flocculent material. Such materials may be formed into cartridges which may be positioned in units intended for use in conjunction with water supply systems. However, it is necessary in such applications of the phosphorus-nitrogen combination with cellulose that the material shall have sufficient strength to prevent sagging. It must have a high physical strength both in the wet and dry conditions so that such material will be able to resist the variations in pressure of the liquid as well as the abrasive action of the flowing stream and suspended solids. It is an advantage of the present combinations employing phosphorylamide with cotton that the treated product has a high physical strength and resists for long periods of time the abrasion and pulsation of a stream of fluid, as well as the lifting action resulting from variations in pressure and rapid start of flow through a system previously at rest.

The following examples illustrates the process of the present invention.

*Example 1*

A measure of the cation exchange ability of the cellulose combination is mixed with a dilute solution of calcium chloride. In carrying out such tests a 0.5 g. sample of the material, based upon the air-dried weight, is soaked for 0.5 hour in a 5% solution of hydrochloric acid in order to provide a reserve of available hydrogen ions for exchange with calcium ions. The sample is then rinsed with water until 50 ml. of wash water remain colorless after addition of one drop of 0.1 N sodium hydroxide together with phenolphthalein indicator solution. The treated material is then placed in a flask with 100 ml. of 0.01 N calcium chloride solution. The flask is then allowed to stand with occasional shaking for a period of 30 minutes. The liquid is then filtered off and the nitrogen-phosphoric-cellulose material is washed. The combined filtrates are then titrated with 0.1 N sodium hydroxide in order to determine the amount of acid produced by the cation exchange operation. The cation exchange capacity as thus determined is 570 milli-equivalents per kg. The tensile strength of the treated cotton fabric was also determined, using the ASTM tensile method employing one-inch jaws.

*Example 2*

The process of the present invention is also applicable to the removal of sodium ions in solutions of sodium silicate. Thus, dilute solutions of sodium silicate may be transformed into silicic acid solutions which have widespread utility in fiber treatment and other industrial processes.

A solution containing 1.4% of sodium silicate was pumped through a metal tube cartridge containing a confined mass of cotton fabric which had been treated with an aqueous solution of 10% of the above-described phosphorus-nitrogen compound. This treatment gave an add-on of approximately 7.4% after acidification by 6 N hydrochloric acid followed by washing to neutrality, and drying at 150° C.

The effluent liquid, after passage through the mass of modified cotton, was analyzed for silicon and sodium content and compared with the original untreated solution. The results of these tests, based upon a spectrographic method measuring the relative intensities of the 2852.8 Å. sodium line and the 2443.4 Å. silicon line are shown below:

|  | Si | Na | Na/Si |
|---|---|---|---|
| Original solution | 164.2 | 7.19 | 0.625 |
| Treated solution | 14.7 | 2.9 | 0.195 |

This shows a reduction factor of 3.2 for the single contacting of the solution and the cellulose combination with the nitrogen-phosphorus composition.

The composition of matter of the present invention also functions as an adsorption medium. It has been found that a solution of Turnbull's blue in water may be completely clarified by adsorption of the color upon the cellulose-phosphorus-nitrogen product. Because of the adsorptive efficiency of this cellulose derivative, this material may also be employed as the adsoprtion medium for separating adsorbable components for individual recovery in the separation method known as chromatographic analysis. Thus, a solution containing several dissolved components may be passed through a column of the cellulose-phosphorus-nitrogen composition, with the result that the adsorbable components are taken up in discrete bands by the column of cellulosic material. Consequently, the column may be removed from the conduit to separate the individual sections.

In general, the product and process of the present invention may be applied to the exchange or neutralization of alkaline impurities in aqueous or organic solutions. Furthermore, the basic substances may be recovered, even in trace quantities such as in alkaloid purification. The treated cellulose-containing phosphorus and nitrogen may also be used as catalysts requiring acid groups without the danger of acid deterioration, such as in the preparation of esters.

The cellulose employed in the product of the present invention may be raw cotton in various forms such as cotton linters or cotton in compacted form, such as may be produced by compressing unwoven cotton fibers into a relatively dense form. Cotton fabrics may also be employed either in a fine or coarse weave as may be desired, although coarser weave materials have the advantage of a lower pressure drop when a liquid flows through a cartridge of the material. However, discs similar to those formed of filter paper or filter cloth may also be employed in the cation exchange operation and continuous filter cloths such as are employed in plate and frame filter presses may also be utilized with the material of the present invention.

It will be obvious to those skilled in the art that changes in the method of preparation and the utilization of the above combination material may be made without departing from the spirit and scope of the invention.

What is claimed and is desired to be protected by Letters Patent of the United States is:

1. A process for preparing a cation exchange material which comprises impregnating cellulose with an aqueous solution of a water-soluble reaction product of one mole of phosphorus oxychloride with at least 5 moles of anhydrous ammonia reacted at a temperature of at least 110° C., but not above 150° C., said reaction product having a pH of from 7.0 to 8.5, a molecular weight of from 180 to 300 and a nitrogen to phosphorus ratio of from 2.1 to 2.5 thereafter reacting the said cellulose impregnated with the said reaction product at a temperature of from 100° C. to 200° C., and thereafter treating the said cellulose with a strong acid.

2. A process for exchanging cations in aqueous solutions which comprises passing the said solution through a mass of cellulose impregnated with an aqueous solution of a water-soluble, ammonia-insoluble reaction product of one mole of phosphorus oxychloride with at least five moles of anhydrous ammonia reacted at a temperature below 150° C., said reaction product having a pH of from 7.0 to 8.5, a molecular weight of from 180 to 300 and a nitrogen to phosphorus ratio of from 2.1 to 2.3, said reaction product being impregnated in the cellulose in the amount of from 5% to 20% by weight relative to the said cellulose, and thereafter reacted with the said cellulose by heating to a temperature of 100° C. to 200° C., and thereafter treated with a strong acid.

3. A cation exchange material comprising the acid-treated reaction product of cellulose with the water-soluble, ammonia-insoluble reaction product of one mole of phosphorus oxychloride with at least five moles of anhydrous ammonia, said reaction product being obtained at a temperature of at least 110° C. but not above 150° C., said reaction product having a pH of from 7.0 to 8.5, a molecular weight of from 180 to 300, and a nitrogen to phosphorus ratio of from 2.1 to 2.5.

4. A process for preparing silica sols which comprises contacting solutions of sodium silicate with the reaction product of cellulose together with the water-soluble, ammonia-insoluble reaction product of one mole of phosphorus oxychloride with at least five moles of anhydrous ammonia by the reaction thereof at a temperature of at least 110° C. but not above 150° C., said reaction product having a pH of from 7.0 to 8.5, a molecular weight of from 180 to 300, and a nitrogen to phosphorus ratio of from 2.1 to 2.3, said reaction product being impregnated in the cellulose in the proportion of from 3% to 90% by weight of the said reaction product relative to the weight of the said cellulose, and said reaction product being reacted with the cellulose by treatment thereof at a temperature in the range of from 100° C. to 200° C.

MORRIS L. NIELSEN.

References Cited in the file of this patent

UNITED STATES PATENTS

| Number | Name | Date |
|---|---|---|
| 2,198,380 | Ellis | Apr. 23, 1940 |
| 2,265,585 | Urbain et al. | Dec. 9, 1941 |